UNITED STATES PATENT OFFICE.

KARL STEPHAN AND PAUL HUNSALZ, OF BERLIN, GERMANY, ASSIGNORS TO CHEMISCHE FABRIK AUF ACTIEN (VORM. E. SCHERING), OF BERLIN, GERMANY.

PROCESS OF MANUFACTURING DIALKYL-BARBITURIC ACIDS.

No. 879,499.  Specification of Letters Patent.  Patented Feb. 18, 1908.

Application filed February 16, 1905. Serial No. 245,835.

*To all whom it may concern:*

Be it known that we, KARL STEPHAN and PAUL HUNSALZ, subjects of the German Emperor, residing at Berlin, Kingdom of Prussia, German Empire, have invented a new and useful Improvement in Processes of Manufacturing Dialkyl-Barbituric Acids, of which the following is a specification.

According to our invention dialkyl barbituric acids, which are known as valuable soporifics, and which have the general formula

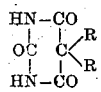

(in this formula R is meant for an alkyl group), are manufactured by causing acids to react upon the corresponding dialkyl-malonyl-guanidins, answering the general formula:

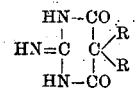

In this way oxygen is introduced in place of the imino group (NH) by hydrolysis. Only the dialkyl barbituric acids, but not the monoalkyl derivatives, can be obtained by this process.

*Examples:*

1. One kilogram of diethyl-malonyl-guanidin is heated with 10 kilograms of fuming hydrochloric acid for four hours to about 125–130° centigrade. After cooling the product of reaction is brought into water, whereby the diethyl barbituric acid separates out. By recrystallizing from water the said acid is further purified.

2. 5 kilograms of diethyl-malonyl-guanidin are heated with 25 kilograms of 10% sulfuric acid for two hours in a reflux condenser. On cooling the diethyl barbituric acid crystallizes out and is then further purified.

3. One kilogram of diethyl-malonyl-guanidin is heated with 12 kilograms of hydrobromic acid for several hours in a closed tube. After cooling the product of reaction separates out.

4. One kilogram of dimethyl-malonyl-guanidin is heated with 10 kilograms of fuming hydrochloric acid to about 120° centigrade for 4 to 5 hours. Then one proceeds as indicated in the first example.

We claim as our invention:—

The herein described method of producing dialkyl barbituric acids, having the herein mentioned general formula, which consists in causing an acid to react in the presence of water upon the corresponding dialkyl-malonyl-guanidins, thereby introducing oxygen in place of the imino group by hydrolysis, and then separating the resulting dialkyl-barbituric acids.

In testimony whereof we have here unto set our names in the presence of two subscribing witnesses.

KARL STEPHAN.
PAUL HUNSALZ.

Witnesses:
HENRY HASPER,
WOLDEMAR HAUPT.